United States Patent [19]

Bealkowski et al.

[11] Patent Number: 4,928,237

[45] Date of Patent: May 22, 1990

[54] COMPUTER SYSTEM HAVING MODE INDEPENDENT ADDRESSING

[75] Inventors: Richard Bealkowski, Delray Beach; Richard A. Dayan, Boca Raton; David J. Doria, Boca Raton; Scott G. Kinnear, Boca Raton; Jeffrey I. Krantz, Boca Raton, all of Fla.; Robert B. Liverman, Raleigh, N.C.; Guy G. Sotomayor, West Palm Beach, Fla.; Donald D. Williams; Gary A. Vaiskauckas, both of Boca Raton, Fla.

[73] Assignee: International Business Machines Corp., Armonk, N.Y.

[21] Appl. No.: 30,789

[22] Filed: Mar. 27, 1987

[51] Int. Cl.[5] ................................. G06F 9/00
[52] U.S. Cl. ...................... 364/200; 364/232.9; 364/254.8
[58] Field of Search ... 364/200 MS File, 900 MS File

[56] References Cited

U.S. PATENT DOCUMENTS

| | | | |
|---|---|---|---|
| 4,004,278 | 1/1977 | Nagashima | 340/172.5 |
| 4,084,224 | 4/1978 | Appell et al. | 364/200 |
| 4,128,875 | 12/1978 | Thurber et al. | |
| 4,270,167 | 5/1981 | Koehler et al. | 364/200 |
| 4,296,468 | 9/1981 | Bandon et al. | |
| 4,315,321 | 2/1982 | Parks, III et al. | 364/900 |
| 4,442,484 | 4/1984 | Childs, Jr. et al. | 364/200 |
| 4,514,805 | 4/1985 | McDonough et al. | 364/200 |
| 4,727,480 | 2/1988 | Albright et al. | 364/200 |
| 4,736,290 | 4/1988 | McCallion | 364/200 |
| 4,747,040 | 5/1988 | Blanset et al. | 364/200 |
| 4,779,187 | 10/1988 | Letwin | 364/200 |
| 4,825,358 | 6/1987 | Letwin | |
| 4,849,875 | 7/1989 | Fairman et al. | 364/200 |

FOREIGN PATENT DOCUMENTS 0197552 10/1986 European Pat. Off.
0208429 12/1986 European Pat. Off.

OTHER PUBLICATIONS

Childs, Jr., et al.; "A Processor Family for Personal Computers"; 1984.
Intel iAPX 286 Operating Systems Writer's Guide, Intel Corporation, 1983.
Intel iAPX 286 Programmer's Reference Manual, Intel Corporation, 1983.

Primary Examiner—Gareth D. Shaw
Assistant Examiner—Rebecca L. Rudolph
Attorney, Agent, or Firm—Winfield James Brown, Jr.

[57] ABSTRACT

A computer system and method for operating a computer system capable of running in mutually incompatible real and protected addressing modes, in which programs written for one mode can be run in the other mode without modification. The operating system using BIOS assembles two different common data areas for the two modes, each inclusive of device block pointers, function transfer table pointers, data pointers, and function pointers. The common data area for the real mode is assembled first. To assemble the pointers for the protected mode common data area, the offset values from the real mode area are copied directly, and then selector values are inserted whose physical addresses correspond to the segments of the corresponding pointers in the real mode area. The selector values are derived from a segment descriptor table.

14 Claims, 6 Drawing Sheets

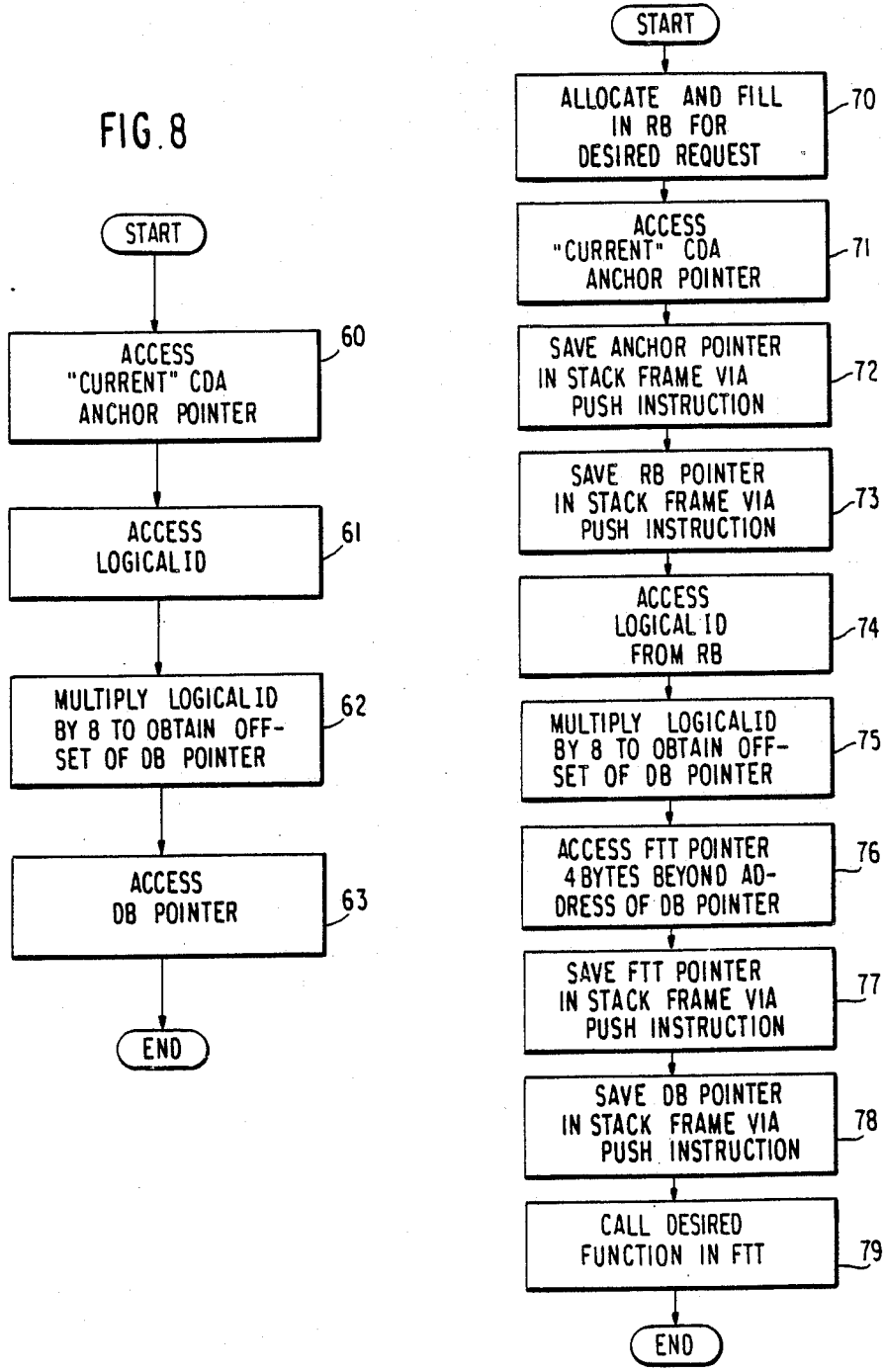

COMPUTER SYSTEM HAVING MODE INDEPENDENT ADDRESSING

DESCRIPTION

TECHNICAL FIELD

The present invention relates to a computer system employing a processor having more than one addressing mode. More specifically, the invention pertains to such a computer system which is capable of running the same applications program in each of plural addressing modes.

BACKGROUND OF THE INVENTION

Microcomputers (personal computers) are being required to perform more and more complex data processing tasks while not suffering a degradation in response speed. On the other hand, in order to perform the more sophisticated tasks, additional device drivers, networking programs, host attachment programs, session managing programs, etc., must be loaded into the available memory space. The amount of space left for the user's applications programs is thus shrinking, forcing undesirable trade-offs to be made among storage, performance, and function.

To remedy this problem, microprocessors have lately become available in which the amount of addressable memory has been greatly expanded. For example, for the Intel Corporation 8088/8086 microprocessor (hereinafter a microprocessor will be referred to for convenience as a "CPU" - central processing unit), the amount of addressable memory is about 1 MB (MegaBytes). while for the newer 80286 CPU. about 16 MB can be addressed.

The 80286, however, employs two different and mutually incompatible addressing modes. The first mode, termed the "real" mode, is exactly the same addressing mode employed in the 8088/8086 CPU, and hence programs written for a machine employing the 8088/8086 CPU, such as the vast array of software written for the IBM PC computer and compatibles, can be run in the real mode since the same BIOS (Basic Input-Output System) can be used directly. In the real mode, however, since the addressing mode is in fact the same as for the 8086/8088, the amount of addressable memory is still limited to about 1 MB. p The second mode, termed the "protected" mode, employs a different memory addressing scheme, and with this scheme can address up to about 16 MB of memory. However, because the addressing mode is indeed different, the earlier BIOS cannot be used successfully, and hence computers which have employed the 80286 CPU have not been able to simultaneously take advantage of the increased amount of available memory in the protected mode and run software written for the 8086/8088 CPU.

FIG. 1 shows a memory map of a typical microcomputer application employing an 80286 CPU and showing an example of how the memory may be organized. Memory addresses in the range of 0 KB (KiloBytes) to 40 KB are taken up by the BIOS (Basic Input-Output System) and OS (Operating System). the most famous examples being PC DOS and MS DOS marketed by Microsoft Corporation. The user is allocated the space from 40 KB to 640 KB in both the real and protected mode. The video buffers occupy 640 KB to 752 KB, and feature and planar ROMs (Read-Only Memories) 752 KB to 1 MB. This is all the memory that can be addressed in the real mode. In the protected mode though 15 MB of additional addressable memory space is available to the user.

To better understand the problem solved by the invention, the two addressing modes will now be described in more detail.

In both the 8088/8086 CPUs and in the real mode in the 80286 CPU, physical memory is addressed directly using 32-bit pointers. As shown in FIG. 2, each 32-bit pointer is composed of a 16-bit offset (bits 0 to 15) and a 16-bit segment (bits 16 to 31). The memory is divided into 64 KB segments, and each of the 16-bit segment values of the pointers corresponds directly to one of these 64 KB segments in memory. That is, pointer segment n, multiplied by $2^4$ (equivalently, shifted one place in hexadecimal), directly indicates the address of the first eight-bit byte of data in segment n of the memory, namely, the boundary between segments n-1 and n in physical memory. The offset, on the other hand, indicates a displacement from the boundary between segments n-1 and n.

As indicated by the diagram of FIG. 3, to obtain the 20-bit value which directly addresses a given byte location (operand address) in physical memory, the segment value is multiplied by $2^4$ and added to the offset value. This 20-bit address is applied directly to the memory as an address.

In the protected mode of the 80286, the BIOS does not use physical memory in the form of segments and offsets. Moreover, the memory is not divided up into 64 KB segments. Instead, "virtual" memory addressing is employed in which the addresses do not correspond directly to distinct locations in physical memory. To allow for more efficient use of the available memory space while still retaining relative ease of addressing, the memory is again divided into segments, but the segments may be of variable lengths. Generation of the actual physical addresses is done internally to the 80286 CPU, out of reach of the user and BIOS.

The protected addressing mode will be explained in more detail with reference to FIG. 4 of the drawings.

As in the case of the 8088/8086 and real mode, the BIOS addresses memory using a 32-bit pointer. In the protected mode, the lower 16 bits (bits 0 to 15) of the pointer are also referred to as an offset. Because its function is different than that of the segment in the 8088/8086 and real mode the upper 16-bit portion of the pointer is termed a "selector". Instead of merely multiplying it by $2^4$ and adding it to the offset, the selector is used as a pointer to a segment descriptor contained in a segment descriptor table, which is assembled in a predetermined area of the physical memory. Each segment descriptor contains a 24-bit value, which indicates the base address (lower boundary address) of the corresponding segment in physical memory. To obtain the actual address of a desired operand in physical memory, the 24-bit segment descriptor value retrieved by the selector is added to the offset.

Because the selectors employed in the protected mode thus have a function which is much different than and nonequivalent to that of the segments in the 8088/8086 and real mode, the BIOS designed for the 8088/8086 and real mode, which uses segments in addressing, cannot operate directly in the protected mode, making it impossible to run in the protected mode programs written to use the BIOS developed for the 8088/8086 and real mode. While such programs can of course be run on the 80286 CPU in the real mode, it is a disadvantage not to also be able to run them in the protected mode.

OBJECTS OF THE INVENTION

Accordingly, it is an object of the present invention to provide a computer system and a method for operating a computer system in which the above-discussed drawbacks have been eliminated.

More specifically, it is an object of the invention to provide a computer system and a method for operating a computer system in which a single BIOS is capable of supporting programs both in the protected mode and in the real mode.

SUMMARY OF THE INVENTION

In accordance with the above and other objects of the invention, there is provided a computer system and a method of operating a computer system having mutually incompatible first and second addressing mode wherein, for each addressing mode, a common data area table is assembled containing pointers used to initiate the various data transfer tasks and other basic input-/output operations which the operating system or applications programs may need. Each pointer in the common data area table for the first mode is equivalent in function to a respective one of the pointers in the common data area table for the second mode. However, the pointers in the two tables are assembled for their respective addressing modes.

In the case of real and protected modes as discussed above, the pointers for the real mode common data area are each composed of a segment and an offset, and those of the protected mode common data area are composed of selectors and offsets. The offsets of the pointers in the protected mode table which point to addresses external to the common data area are identical in value to those of corresponding pointers in the real mode table, while the selectors correspond in physical address to the segments of the corresponding pointers.

BRIEF DESCRIPTION OF THE DRAWINGS

FIG. 8 is a flowchart showing an example of how a device block pointer is obtained for a given logical ID.

FIG. 9 is a flowchart illustrating how a request is made to the BIOS in the computer system of the invention.

DETAILED DESCRIPTION OF THE PREFERRED EMBODIMENT OF THE INVENTION

Figure 1:
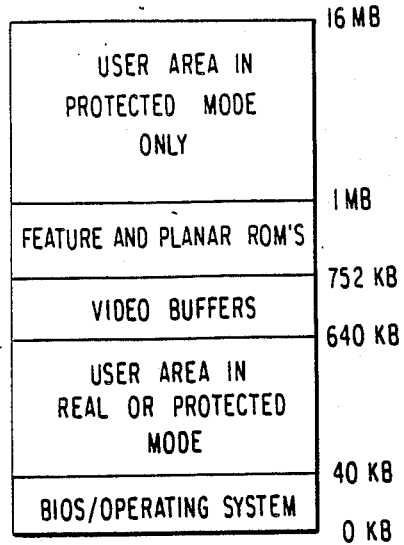
FIG. 1 is a memory map of an example of a computer system employing a CPU having real and protected addressing modes.
Figure 5:
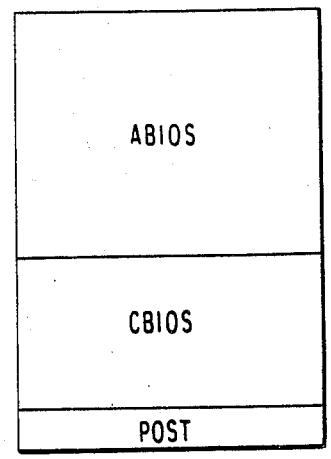
FIG. 5 is a diagram showing how the BIOS code is arranged in accordance With the present invention.
Figure 2:
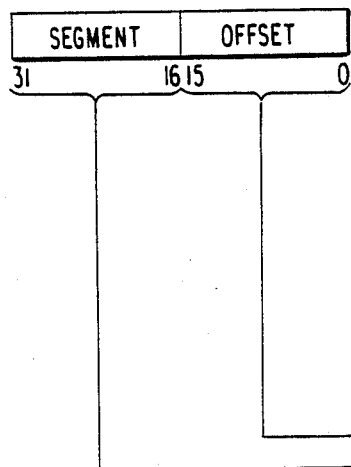
FIG. 2 shows a portion of a main memory in the real mode and illustrates how the memory is addressed using offsets and pointers.
Figure 2:
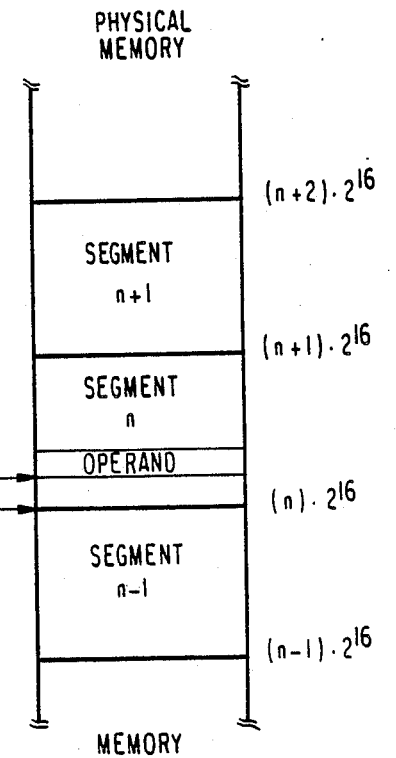
Figure 3:
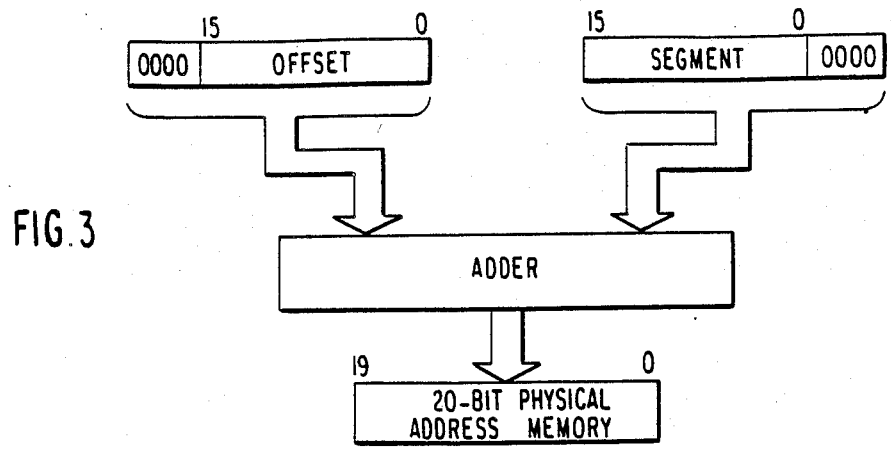
FIG. 3 depicts how segments and offset values are manipulated and added to produce physical memory addresses in the real mode.
Figure 4:
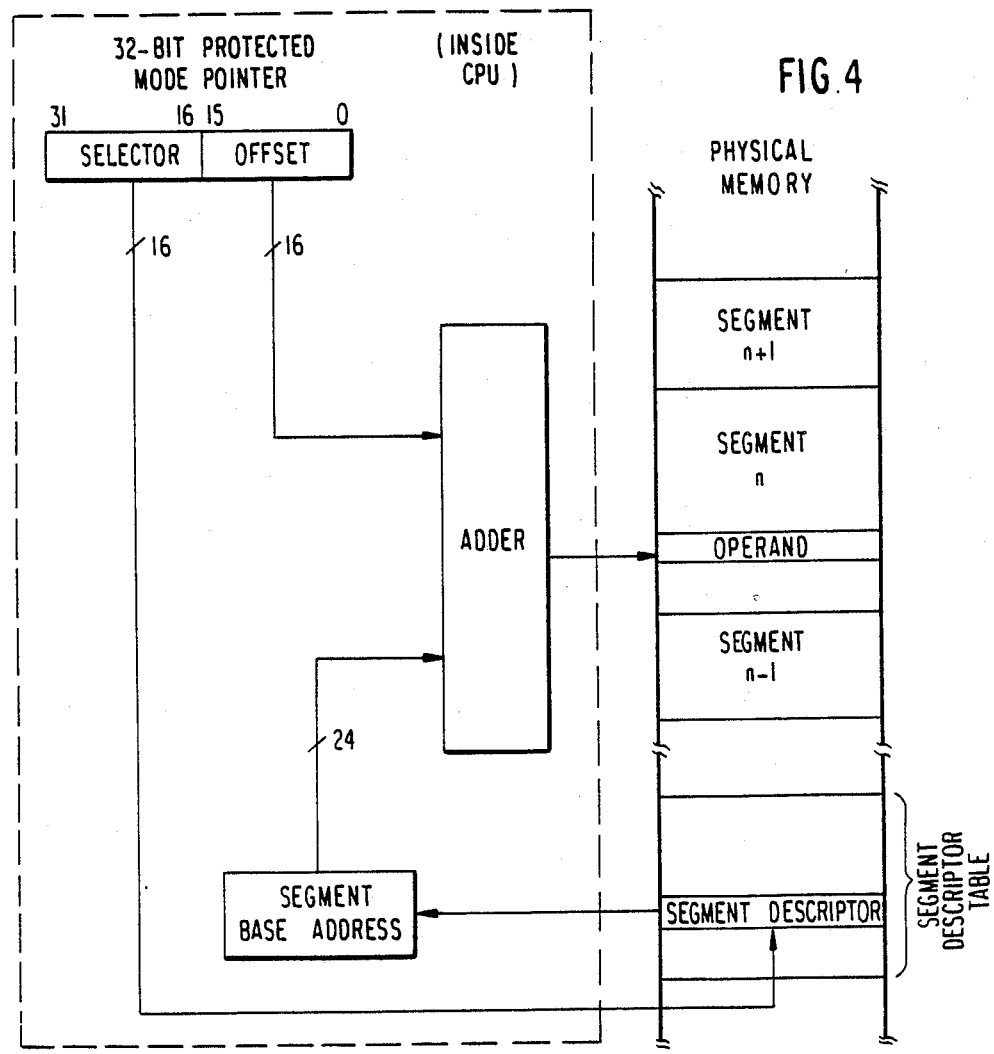
FIG. 4 shows a portion of a main memory in the protected mode and illustrates how the memory is addressed using offsets and pointers.

Referring first to the diagram of FIG. 5, there is shown therein a memory map for the BIOS code employed in the computer system of the invention.

The BIOS code is composed of three parts: POST, CBIOS and ABIOS. POST (Power-On Self Test) is used for performing initial self testing and other basic start-up functions, including extracting the boot record from the system disk and subsequent loading of the operating system into memory. CBIOS (Compatibility Basic Input-Output System) contains the BIOS used by applications programs for performing input-output operations (transfers of data to and from memory, peripherals, etc.) in the real mode only and in a single-tasking environment. ABIOS (Advanced Basic Input-Output System) contains the BIOS used by applications programs for performing input-output operations in a bimodal (i.e. effective in both real and protected modes), multi-tasking environment, as well as the BIOS routines used by the operating system for constructing tables required for the present bimodal addressing operations.

In accordance with the present invention, the ABIOS is given the capability of operating either in the real mode or the protected mode. The way in which this is done is for the ABIOS to assemble bimodal CDAs (Common Data Areas), one for the real mode and one for the protected mode. The entries contained in the two CDAs are identical in function, but in the real mode CDA the pointers are described in terms of segments and offsets, while in the protected mode CDA they are described in terms of selectors and offsets. If the operating system intends to execute BIOS only in the real mode, then only the real mode CDA need be assembled and used, whereby BIOS-controlled data transfers for applications programs take place in the previously known manner for operations in the real mode. Before the operating system can execute BIOS in the protected mode, however, the protected mode CDA must be assembled. By use of the protected mode CDA, which may be made to produce addresses identical to those produced via a corresponding section of the real mode CDA, programs initiated in one mode can be continued in the other mode, at the user's option and without requiring mode switching operations for continuation. Hence, by providing such CDAs for supporting corresponding addressing operations in both modes, the ABIOS code can be made to operate essentially "transparent" to the mode in which the user has selected to run the CPU. The result is mode-independent addressing for the applications programs.

Figure 6:
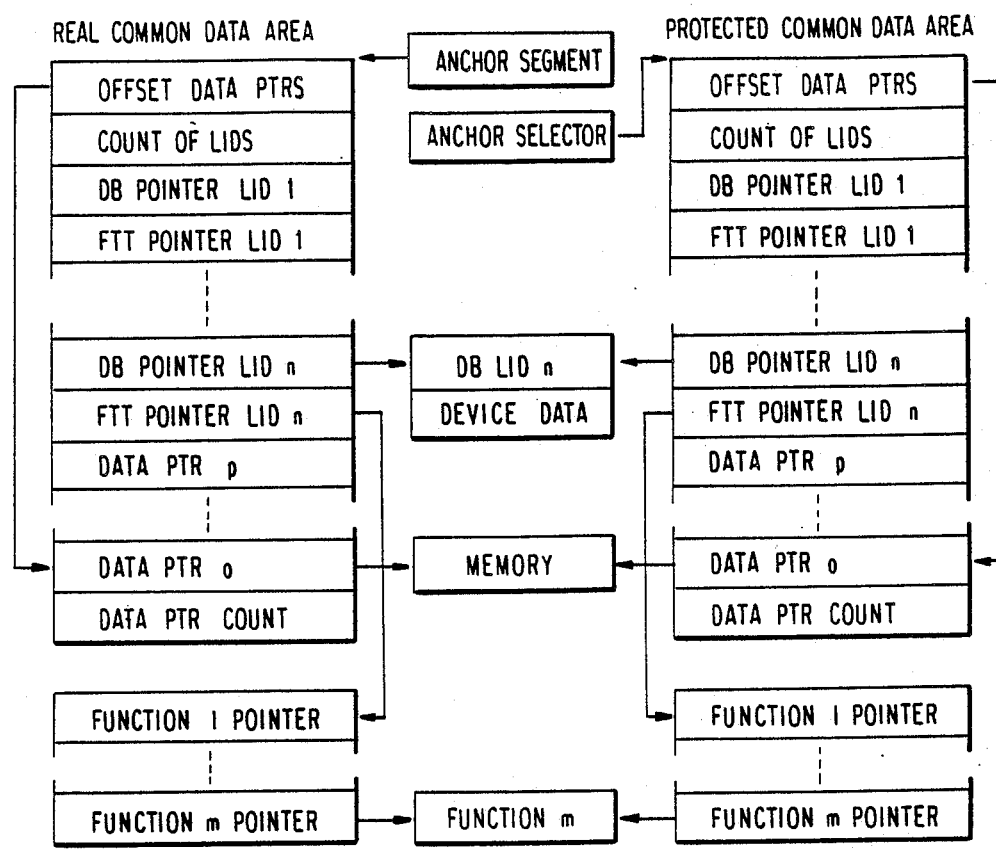
FIG. 6 is a map of a bimodal common data area in accordance with the invention.

An example of bimodal CDAs is shown in accompanying FIG. 6. The following abbreviations are used in FIG. 6 for simplicity:

LogicalID (LID)—Each LID corresponds to and identified a requested device or device controller. Each device or device controller available to ABIOS has a LID associated therewith.

Device Block (DB)—The DB is a working storage area allocated by the operating system which contains hardware port addresses, interrupt levels, and device state information.

Function Transfer Table (FTT)—The FTT is a permanent storage area allocated by the operating system and which contains the pointers to each ABIOS function routine.

ABIOS Data Pointer (Data Ptr)—The data pointers supply the ABIOS with addressability to particular portions of memory in the bimodal environment. Examples are the pointers to the video buffers.

As can readily be appreciated from FIG. 6, in general, the entries in the two CDAs are entirely identical in function and in their place within the respective tables, the only difference is that the pointers in the real mode CDA are composed of segment and offset values, and the pointers in the protected mode CDA are composed of selectors and offsets. Thus, by merely employing the CDA corresponding to the present operating mode of the CPU, so far as the remainder of the BIOS, the operating system, and the applications programs are concerned, all BIOS operations are performed in the identical manner between the two modes. That is, as illustrated in FIG. 6, the corresponding DB pointer LID n in the two tables both point to the same DB LID n, the corresponding data pointer 0 in the two tables point to the same identical location in memory, and the same function m pointers point to the same identical function m.

Figure 7A:
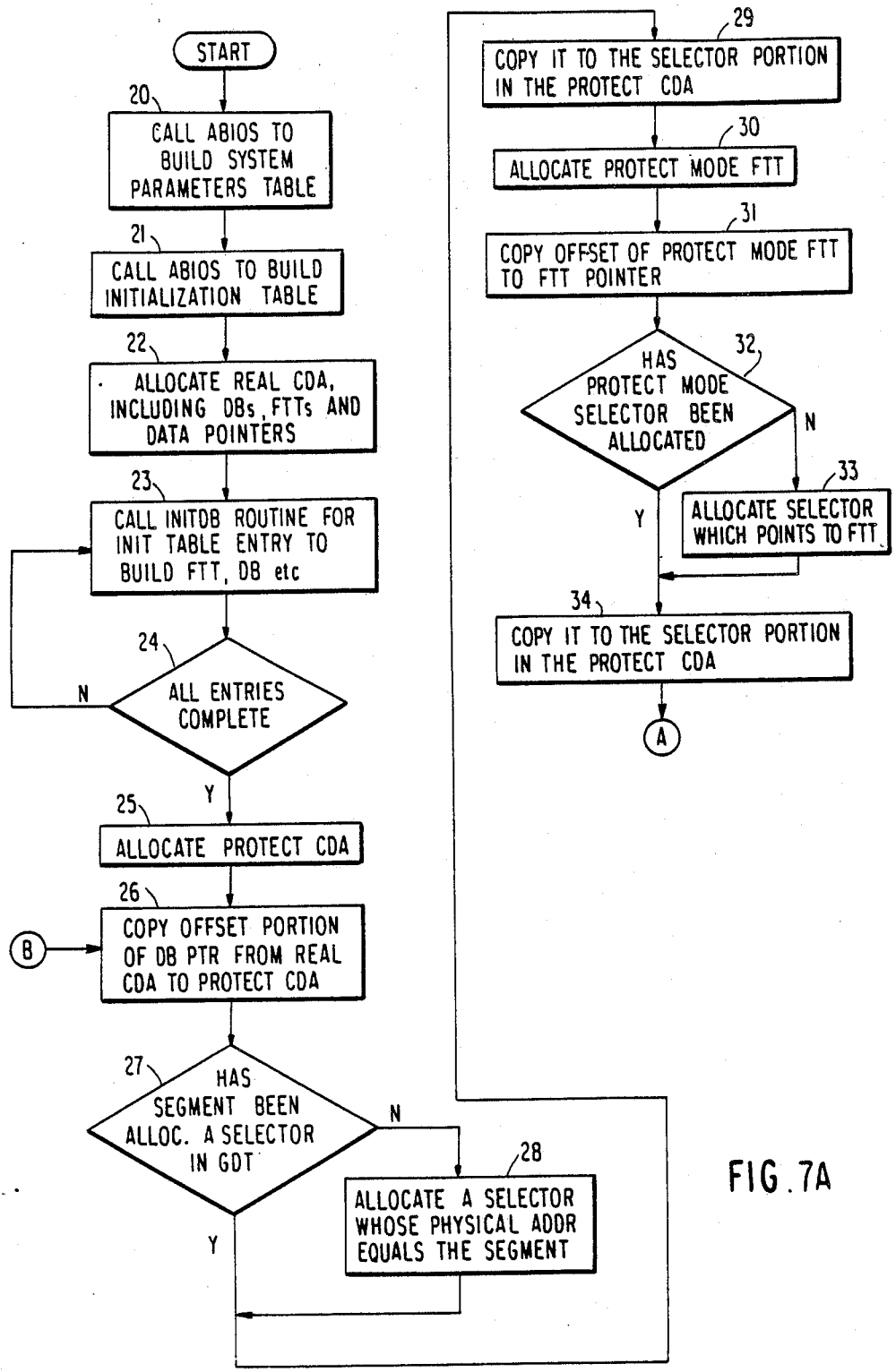
FIGS. 7A and 7B are a flowchart showing in detail how the bimodal common data area illustrated in FIG. 6 is assembled.
Figure 7B:
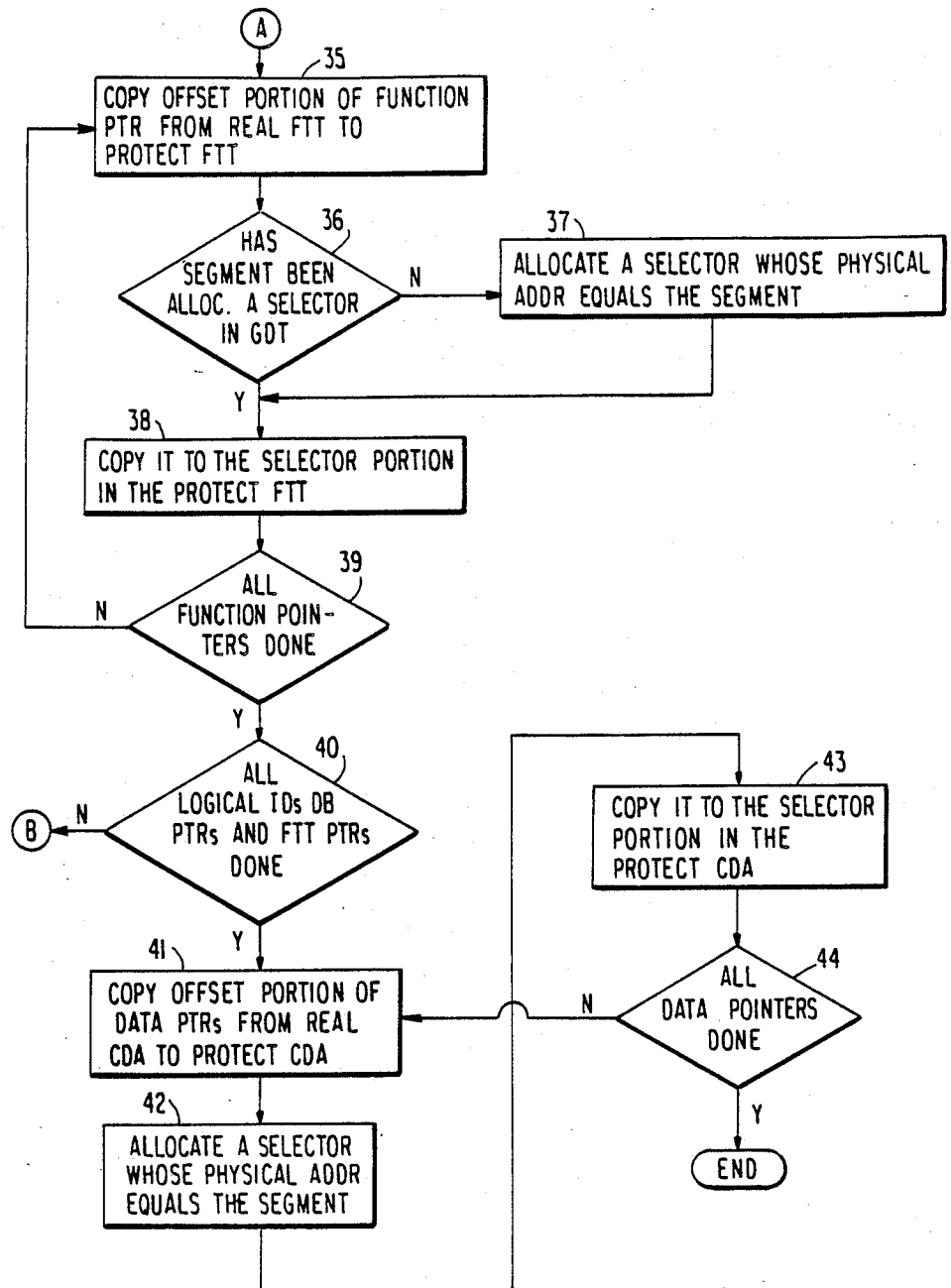

FIG. 7 is a flowchart describing in detail the manner in which the two CDAs are assembled. The operations to be described next are conducted during system initialization, generally after execution of the POST tests and with the system running in real mode.

From the START point, the ABIOS is called to build the systems parameters table in step 20. In step 21, ABIOS is called to build the initialization table. Next, in step 22, memory space is allocated for the real mode CDA, including the DBs, FTTs, and data pointers. In subsequent step 23, an initial DB (InitDB) routine is called for initial table entries to build the FTT, DB, etc. Those having familiarity with the BIOS used in the IBM AT computer will understand the further details of how steps 20 to 23 are implemented.

After it has been determined in step 24 that all entries in the real mode CDA table are complete, in step 25, memory space is allocated for the protected mode CDA. In following step 26, in accordance with an important aspect of the invention, an offset portion of a DB pointer in the real mode CDA copied directly to the corresponding entry in the protected mode CDA. For the offset value copied in step 26, in steps 27 and 28, a selector is allocated whose physical address is equal to the segment of the respective pointer in the real mode CDA. In step 29, the selector is copied to the corresponding position in the protected mode CDA to complete the pointer.

With reference to steps 30 to 34, an FTT pointer is assembled in a slightly different manner than the DB pointers in steps 26 to 29 since the FTT pointers point to other pointers within the CDA rather than addresses external to the CDA. In step 30, a protected mode FTT is allocated and, in step 31, a copy of the, offset of the corresponding real mode FTT pointer is copied to the protected mode FTT pointer. In subsequent step 32, a determination is made as to whether the protected mode selector has been allocated. If not, in step 33, a selector is allocated which points to the FTT. In step 34, the selector is copied to the selector portion in the protected mode CDA.

Similar to the assembly of the DB pointer in steps 26 to 29, in steps 35 to 38, a corresponding function pointer is assembled in the protected mode CDA.

Step 39 tests to determine if all pointers of the FTT have been completed. Steps 35 to 39 are repeated until all pointers of the FTT have been assembled. Following step 40 tests to determine whether all logical IDs, DB pointers, and FTT pointers have been completed. If not, the process loops back to step 26, and steps 26 to 40 are repeated until all logical IDs, DB pointers, and FTT pointers have been completed.

To finish the protected mode CDA, in step 41, the data pointers (e.g., pointers to the video buffer) are assembled. This is done in the same fashion as above. In step 41, the offset portion of a data pointer from the real mode CDA is copied to the corresponding entry in the protected mode CDA, and in step 42, a selector is allocated having a physical address equal to the segment in the corresponding real mode CDA entry. The selector is copied into the protected mode CDA in step 43. In step 44, it is determined if all data pointers have been completed. If not, the process loops back to step 41, whereupon steps 41 to 44 are repeated until all data pointers have been finished. At that time, assembly of both CDAs is completed.

To show an example of how the assembled CDA is used by the ABIOS, FIG. 8 is a flowchart showing an example of how a DB pointer is obtained from the bimodal CDA for a given logical ID.

First, the "current" CDA anchor pointer and the corresponding logical ID are accessed in steps 60 and 61. In step 62, the logical ID is multiplied by $2^3$ (=8) to obtain the offset for the DB pointer. Then, in step 63, the DB pointer can be accessed.

FIG. 9 is a flowchart showing how a program makes a request to the ABIOS.

First, in step 70, a request block for the specific request at hand is allocated and filled in. In step 71, the "current" CDA anchor pointer is accessed. In subsequent steps 72 and 73, the anchor pointer and the RB pointer are saved in the stack frame using PUSH instructions. The appropriate logical ID from the RB is accessed in step 74. (There is of course a one-to-one correspondence between logical IDs and device entries in the CDA.) In step 75, the logical ID is multiplied by $2^3$ to obtain the offset of the DB pointer (four bytes/pointer, two pointers). The respective FTT pointer four bytes beyond the address of the DB pointer is accessed in step 76, and this FTT pointer is saved to the stack frame using a PUSH instruction in step 77. In step 78, the DB pointer is saved to the stack frame, also using a PUSH instruction. Finally, in step 79, the desired function is called in the FTT.

Further applications are also contemplated within the scope of the invention. For example, "patching" of the BIOS code to effect changes thereto can be achieved using the FTT pointers. That is, FTT pointers can be inserted in the CDAs which cause redirection to patch routines.

This completes the description of the preferred embodiment of the invention. It is to be understood though that while modifications can be made to the structure and teachings of the present invention as described above, such modifications fall within the spirit and scope of the present invention as specified in the claims appended hereto.

Having thus described our invention, what we claim as new, and desire to secure by Letters Patent, is:

1. A personal computer system having a system processor, said personal computer system comprising:
an addressable memory having a first and second portion, the first portion of memory being divided into a predetermined number of segments and the second portion of memory having a number of segments exceeding the predetermined number of segments of the first portion;

a microprocessor operating as the system processor and capable of processing memory access requests, said microprocessor operating in two switchable modes, the first mode being a mode in which the microprocessor addresses directly the first portion of memory, and the second mode of the microprocessor being a protected mode in which the microprocessor addresses the second portion of memory, wherein when the microprocessor is in the first operating mode, addressing the second portion of memory is incompatible with the operation mode of the microprocessor, and further wherein when the microprocessor is in the second operating mode, addressing the first portion of memory is incompatible with the operating mode of the microprocessor; and addressing means comprising first and second common data areas for said first and second modes, respectively, said first and second common data areas each comprising a plurality of pointers, each of said pointers in said first common data area having a corresponding pointer in said second common data area, said pointers in both said first and second common data areas comprising a higher order portion and a lower order portion, lower order portions of corresponding pointers in said first and second common data areas being equal to one another, said higher order portions of said pointers in said first common data area being indicative of boundaries between segments in said first portion of memory, and said higher order portions of said pointers in said second common data area being indicative of boundaries between segments in said memory occurring at locations specified by a segment descriptor table;

a first anchor pointer pointing into said first common data area such that whenever the microprocessor is in the first operating mode the microprocessor addresses the first common data area to enable access to a predefined location in memory; and a second anchor pointer pointing into said second common data area such that whenever the microprocessor is in the second operating mode, the microprocessor addresses the second common data area to enable access to the same predefined location in memory, wherein a response to a memory access request in either operating mode of the microprocessor, said addressing means enables the microprocessor to address the same location in memory without the microprocessor switching modes.

2. The computer system of claim 1, wherein said memory includes data representing device block vectors, function transfer table information, and function control information, and said pointers in each of said first and second common data areas comprise device block pointers, function transfer table pointers, and function control pointers.

3. The computer system of claim 2, wherein said memory includes BIOS code defining input/output routines relative to said memory and other parts of said system, said memory further including one or more patch routines for effectively modifying actions of said BIOS code, and wherein at least one of said function transfer table pointers points to said patch routine for BIOS code.

4. A method for operating a personal computer system having a system processor and a memory, the memory including a physical portion and a portion thereof comprised of segments separated by boundaries, the system processor operating in either one of two mutually incompatible memory addressing modes, the first mode being a mode in which the system processor addresses directly the physical portion of memory, and the second mode being a protected mode in which the system processor addresses the portion of memory comprised of segments, said method comprising the steps of:

allocating space in memory for first and second common data areas for said first and second addressing modes, respectively;

assigning a first anchor pointer pointing into said first common data area such that whenever the microprocessor is in the first operating mode the microprocessor addresses the first common data area to enable access to a predefined location in memory;

assigning a second anchor pointer pointing into said second common data area such that whenever the microprocessor is in the second operating mode, the microprocessor addresses the second common data area to enable access to the same predefined location in memory;

filling said first common data area with a first set of pointers for respective memory access requests, said pointers of said first set having a higher order portion and a lower order portion, said higher order portion being indicative of a boundary between segments in said memory, each said boundary occurring at predetermined intervals, and said lower order portion being indicative of an offset from the boundary indicated by said higher order portion; and filling said second common data area with a second set of pointers comprising:

copying from said first common data area said lower order portion of each of said pointers of said first set, and filling in as a higher portion of each pointer of said second set a value indicative of a segment boundary specified in a segment descriptor table having a physical address equal to that of the respective higher order portion of said pointers of said first set wherein said first and second common data area permit the system processor to address the same physical portion of memory in either one of the addressing modes without the system processor switching addressing modes.

5. The method for operating the personal computer system of claim 4, wherein said memory includes as information device block vector information, function transfer table information, user data and function control information, and wherein said step of filling said first common data area comprises assembling as said pointers for locating said device block information, said function transfer table information, said user data, and said function control information.

6. The method for operating the personal computer system of claim 5, wherein said memory includes BIOS code having a predetermined function and a patch routine for modifying the effect of said BIOS code, and at least one of said function transfer table pointers points to said patch routine.

7. A personal computer system comprising:

a central processing unit comprised of a microprocessor operating in either one of a first or a second mutually incompatible addressing mode;

a memory coupled to the central processing unit for storing information, said memory being addressable by said processing unit in either one of said first and second addressing modes;

means for addressing said memory, said addressing means cooperating with said central processing unit for controlling the presentation of addressing information to said central processing unit in said first and second addressing modes, said addressing means further comprising first and second tables for the first and second modes respectively, each table including pointers to predetermined respective regions of said memory, wherein at least some of said pointers in said first table having corresponding pointers in said second table a first anchor pointer directing said central processing unit to said first tables whenever said central processing unit is in the first addressing mode; and a second anchor pointer directing said central processing unit to the second tables whenever said central processing unit is in the second addressing mode;

whereby said central processing unit may be directed to address the same location in said memory in either addressing mode without said central processing unit switching address modes.

8. The computer system of claim 7, wherein a portion of said memory is addressable by said central processing unit in only one of said addressing modes.

9. The computer system of claim 7, wherein each pointer in said first and second tables comprises a lower order portion and a higher order portion, lower order portions of corresponding pointers in said first and second tables being equal to one another.

10. The computer system of claim 9, wherein a portion of said memory is comprised of segments separated by boundaries and further wherein said higher order portions of said pointers in said first table are indicative of boundaries between segments in said memory occurring at a predetermined interval.

11. The computer system of claim 10, wherein said memory contains a segment descriptor table for use by said system in said second mode, and said higher order portions of said pointers in said second table are indicative of boundaries between segments in said memory occurring at locations specified by a segment descriptor table.

12. A personal computer system comprising:

an addressable memory having at least one physical portion;

a central processing unit having a microprocessor operating in a first and second operating modes characterized by distinctly different operations for constructing addresses relative to said memory;

means for storing first and second sets of tables respectively associated with said first and second modes, said first set of tables containing address pointer parameters assigned to program applications which can be processed in said first mode, said second set of tables containing address pointer parameters assigned to program applications which can be processed in said second mode;

a first anchor pointer directing said central processing unit to said first set of tables whenever said central processing unit is in the first operating mode;

a second anchor pointer directing said central processing unit to said second set of tables whenever the central processing unit is in the second operating mode;

means for constructing said first and second tables as an initial operation in said system; and means coupled to said constructing means for selectively designating associated address pointer parameters to be entered into said first and second tables relative to a given program application, said associated parameters being inter-related to effectively point to identical physical addresses in said memory, whereby address references in said given program application can be processed by said system transparently in either said first or said second mode.

13. A personal computer system having a system processor and an addressable memory, the system processor comprising a microprocessor which operates in a first and second mode, the first mode being a mode in which the microprocessor addresses directly a first portion of the memory, and the second mode being a mode in which the microprocessor addresses a second portion of memory being larger than the first portion of memory, the microprocessor further capable of switching modes to run computer application programs in either one of the modes, said system comprising:

a first addressing means comprised of a first table having a set of pointers, the first table pointers being selected for enabling the microprocessor to address a predefined location in memory when the microprocessor is operating in the first mode;

a second addressing means comprised of a second table having a set of pointers corresponding to the first table pointers, the second table pointers being selected for enabling the microprocessor to address the same predefined location in memory when the microprocessor is operating in the second mode;

a first anchor pointer directing the microprocessor to the first addressing means when the microprocessor is in the first operating mode;

a second anchor pointer directing the microprocessor to the second addressing means when the microprocessor is in the second operating mode, such that whenever a memory access is requested, the microprocessor can be directed to the same predefined location in memory without the microprocessor switching modes.

14. The personal computer system of claim 13, wherein said second portion of memory includes said first portion of memory.

* * * * *